(12) United States Patent
Ciscato et al.

(10) Patent No.: US 11,706,035 B2
(45) Date of Patent: *Jul. 18, 2023

(54) SIGNATURE VERIFICATION USING BLOCKCHAIN

(71) Applicant: Red Hat, Inc., Raleigh, NC (US)

(72) Inventors: Bruno Ciscato, Farnborough (GB); Dominic Hart, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,633

(22) Filed: Sep. 13, 2021

(65) Prior Publication Data

US 2021/0409230 A1 Dec. 30, 2021

Related U.S. Application Data

(63) Continuation of application No. 16/120,786, filed on Sep. 4, 2018, now Pat. No. 11,128,472.

(51) Int. Cl.
| | |
|---|---|
| *H04L 9/32* | (2006.01) |
| *G06Q 20/36* | (2012.01) |
| *H04L 9/00* | (2022.01) |
| *G06Q 20/06* | (2012.01) |
| *G06Q 20/12* | (2012.01) |
| *G06Q 20/38* | (2012.01) |
| *G06F 21/64* | (2013.01) |
| *G06F 8/60* | (2018.01) |

(52) U.S. Cl.
CPC ............ *H04L 9/3247* (2013.01); *G06F 21/64* (2013.01); *G06Q 20/3678* (2013.01); *H04L 9/3236* (2013.01); *G06F 8/60* (2013.01); *G06Q 2220/00* (2013.01); *H04L 9/50* (2022.05)

(58) Field of Classification Search
CPC ....... H04L 9/3247; H04L 9/3236; H04L 9/50; H04L 9/3239; G06F 21/64; G06F 8/60; G60Q 20/3678; G60Q 20/0655; G60Q 20/123; G60Q 20/3825
See application file for complete search history.

(56) References Cited

U.S. PATENT DOCUMENTS

| | | | |
|---|---|---|---|
| 2017/0279774 A1* | 9/2017 | Booz | G06Q 20/0658 |
| 2017/0279818 A1 | 9/2017 | Milazzo et al. | |
| 2017/0357496 A1 | 12/2017 | Smith et al. | |
| 2018/0096042 A1 | 4/2018 | Kuzma et al. | |

(Continued)

FOREIGN PATENT DOCUMENTS

WO 2018031703 A1 2/2018

OTHER PUBLICATIONS

Johnston et al. (Johnston), The General Theory of Decentralized Applications, DApps; published 2014 (Year: 2014).*

(Continued)

*Primary Examiner* — Vu V Tran
(74) *Attorney, Agent, or Firm* — Womble Bond Dickinson (US) LLP

(57) ABSTRACT

A package management system to initiate a transaction in a blockchain system. The transaction comprises an indication of the signature for the software package and is to be stored in a blockchain. The package management system distributes the software package to a computing device with an indication of a location of the signature in the blockchain.

20 Claims, 4 Drawing Sheets

(56) References Cited

U.S. PATENT DOCUMENTS

| | | | | |
|---|---|---|---|---|
| 2018/0176229 | A1* | 6/2018 | Bathen | H04L 9/3247 |
| 2019/0065709 | A1* | 2/2019 | Salomon | G06F 8/71 |
| 2019/0163883 | A1* | 5/2019 | Savanah | H04L 67/104 |
| 2019/0305937 | A1* | 10/2019 | Baykaner | H04L 9/3297 |
| 2019/0305959 | A1* | 10/2019 | Reddy | H04L 9/006 |
| 2020/0067696 | A1 | 2/2020 | Sarin | |
| 2020/0073657 | A1* | 3/2020 | Robison | H04L 9/0637 |
| 2020/0379979 | A1* | 12/2020 | Thekadath | H04L 9/3239 |

OTHER PUBLICATIONS

Secure software delivery and installation in embedded systems, by Huber et al., published Feb. 2006 (Year: 2006).*

Al-Bassam et al., "Contour: A Practical System for Binary Transparency", University College London, https://arxiv.org/pdf/1712.08427.pdf, Dec. 22, 2017, 14 pages.

Haplin, "Updatechain: Using Merkle Trees for Software Updates", https://courses.csail.mit.edu/6.857/2016/files/28.pdf, May 11, 2016, 15 pages.

"Important for Bitcoin Users: How to Verify PGP Signatures of Bitcoin Software", https://www.reddit.com/r/Bitcoin/comments/7flvfy/important_for_bitcoin_users_how_to_verify_pgp/, Reddit, Nov. 26, 2017, 11 pages.

"Internet-of-People/iop-blockchain", https://github.com/Internet-of-People/iop-blockchain/tree/master/contrib, GitHub Inc., Sep. 25, 2017, 2 pages.

"BlockChain Fundamentals Part 1", https://ajithp.com/tag/blockchain-cryptography/, blockchain cryptography—Ajith Prabhakar's Weblog, 17 pages.

Amati, "Using the blockchain as a digital signature scheme", Signatura blog, https://blog.signatura.co/using-the-blockchain-as-a-digital-signature-scheme-f584278ae826, 6 pages.

* cited by examiner

SIGNATURE VERIFICATION USING BLOCKCHAIN

CROSS REFERENCE TO RELATED APPLICATIONS

This application is a continuation of U.S. patent application Ser. No. 16/120,786, filed Sep. 4, 2018, the contents of which are incorporated by reference herein.

TECHNICAL FIELD

Aspects of the present disclosure relate to verification of software using signatures.

BACKGROUND

Computer systems can execute and install a variety of software packages and systems from third party sources. Prior to running code from a third party source, the computer system may verify a package using a signature. Signatures may include information about the expected data in a payload, a cryptographic hash, or other information that can verify the package. The verification relies on secure storage signatures.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
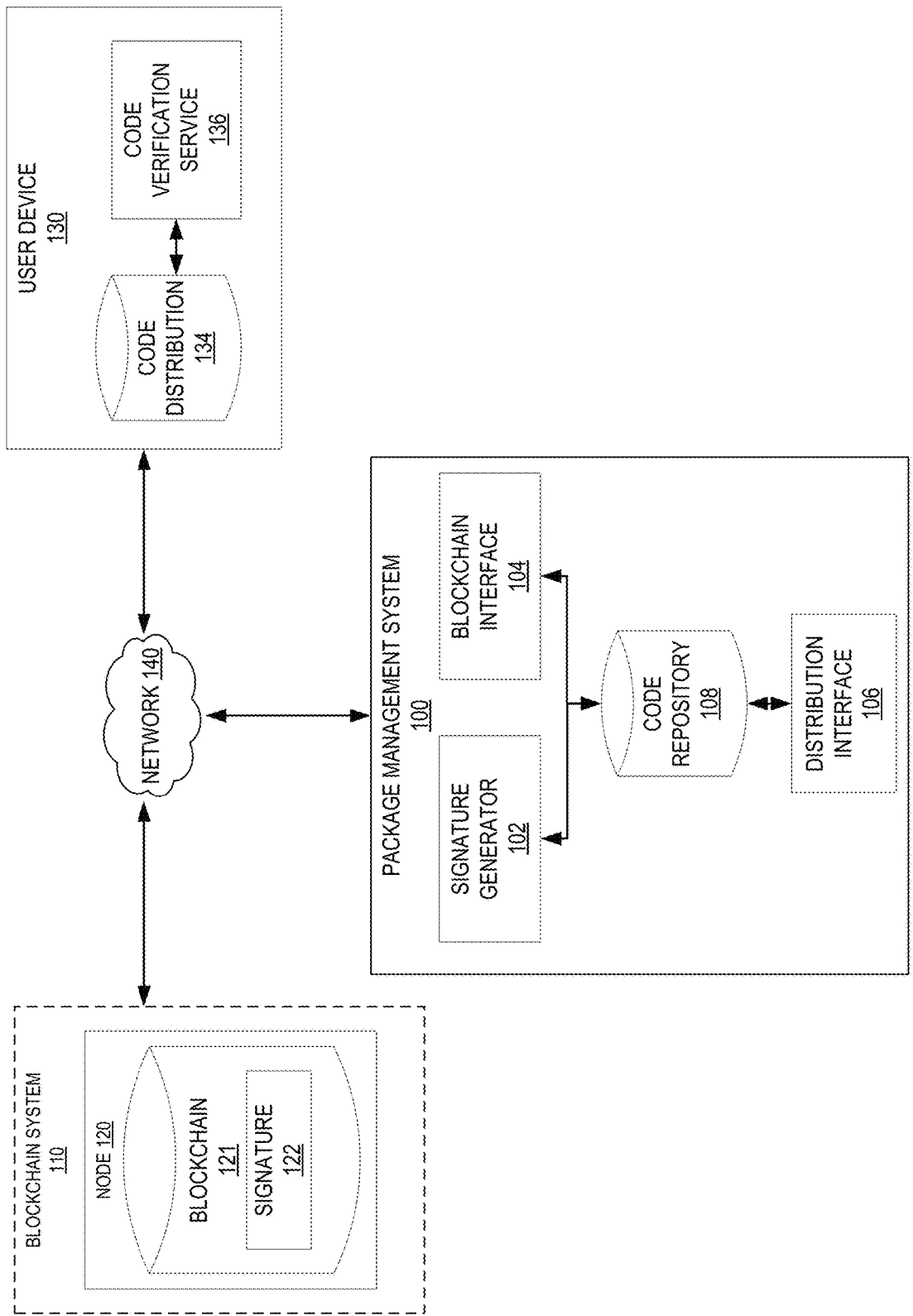
FIG. 1 is a block diagram that illustrates an example of a package management system in accordance with some aspects of the present disclosure.

Disclosed herein are systems and methods to improve reliability of signatures of software packages, containers, or other code distributions. When a computer system installs or updates a software package, there is an inherent security risk from the new package. To reduce potential issues from intentionally malicious software or corrupted software, computer systems verify software packages with a package signature prior to installing or executing the software packages. However, the security of the system is tied to the security of the signatures themselves. Accordingly, systems described herein store package signatures using blockchain technology so that they are immutable and cannot be changed.

Software packages or other software distributions may include a number of components that are used when installing or running the software. For example, a package may include one or more of a package identifier, a signature, a header, and software code itself. In some embodiments, one or more of these components may be compressed or encrypted. When a computer system receives a package, it can verify the security through the use of a signature. For example, the signature may provide a cryptographic key to verify the integrity and authenticity of the software package.

Because signatures can are used to verify authenticity of software packages, they may also be a source of potential attack from a malicious actor. For example, a hacker may compromise a package and change the software. However, if a user tries to install the package, the installation will fail when the user tries to verify the package with the signature. Accordingly, the hacker will also have to change the signature to have users install the compromised package. In addition, a hacker may change the signature for the package, and legitimate installations of the software package will fail because the package does not match the corrupted signature. In both cases, the security of the software package is based upon the security of the signatures themselves, which is based upon security of the server that stores the signature.

The present disclosure addresses the above-noted and other deficiencies by improving the security of package signatures by storing them on a blockchain system. Blockchains provide a reliable, distributed, immutable, and persistent ledger of transactions. Currently popular blockchain applications, such as Bitcoin, Ethereum, and others, include information about each transaction including an associated buyer, seller, and transaction amount. The transactions are packaged as a block and a hash is generated for the transaction block. Each transaction block may include a record of the transactions, headers, metadata, a hash of previous blocks, or additional information.

In some embodiments, a blockchain is collectively maintained by "miners," who are members within the network that compete to validate blockchain transactions in each block by solving a complex mathematical problem associated with the block. In some embodiments, miners are incentivized to validate blockchain transactions by rewarding them with some amount of monetary compensation upon successful completion. In some embodiments, a blockchain may be maintained by systems without use of proof-of-work solutions. For example, a number of trusted peer systems may implement a blockchain system.

Because the blockchain is stored in a number of peer systems with validated transactions and chained blocks that prevent changes to previous blocks, it creates a ledge of transactions that cannot be changed. Accordingly, each transaction that is recorded becomes an immutable record. Therefore, a package management system can record package signatures as a record on a blockchain in order to store it in a manner that cannot be changed by a malicious actor.

In some embodiments, the package management system may store signatures directly to a blockchain as part of a transaction. For example, when initiating a transaction, a user can indicate a sending address, a receiving address, what is provided in the transaction and some metadata. Accordingly, the package management system may initiate a transaction with a minimal amount of a cryptocurrency and in the metadata include the signature. When the transaction is validated and stored in a block of the blockchain, it is then secured in an immutable format. In some embodiments, the transaction may be sent between known addresses such that the cryptocurrency is not lost permanently. In some embodiments, a command to record the signature in the blockchain may be performed without generating a transaction. For example, in Bitcoin an "OP_Return" command can be executed to record data in a transaction without sending currency.

In some embodiments, a package management system may use Merkle roots or other has chaining or hash tree systems to secure signatures in a blockchain. The Merkle roots provide an anchor to verify large amounts of data in a blockchain. The Merkle root stored in the blockchain can then be accessed and used to verify the anchored data. This may improve the amount of transactions or data that is to be stored in the blockchain.

After a signature is stored in the blockchain, it is secure and unchanging. When a software package is distributed, rather than verifying the package with a trusted third party that has a record of the signature, a computing system can verify the package using the signature stored on the blockchain. For example, the computing system may search for a transaction that contains the signature and verify the signature accordingly. In some embodiments, if a Merkle tree was used for example, the record in the transaction may be used to verify anchored information.

Although described generally as storage and management of signatures for software packages, signature management systems may also use blockchain technology for storage of other software distributions. For example, signatures for other applications, containers, virtual machines, or other software that needs to be verified can be stored on the blockchain and used to verify the software distribution in similar ways. Accordingly, before creating a new instance of a container, virtual machine, or other software component, a computer system may validate the application using a signature stored on a blockchain system.

FIG. 1 is a block diagram depicting an example of a package management system 100 in communication with a blockchain system 110 and a user device 130. The package management system 100 may generate package signatures for storage on a blockchain system 110. User devices, such as user device 130, that receive a code distribution 134 can then use a record of the signature 122 stored on blockchain 121 to verify the authenticity of the code distribution 134.

In some embodiments, the package management system 100 may include a signature generator 102, a blockchain interface 104, a distribution interface 106, and a code repository 108. In various embodiments, the package management system 100 may include fewer or additional components, or the components may be combined or divided differently. The code repository 108 may include a number of software packages. The package management system 100 may make the software packages in code repository 108 available to user devices 130, either directly or through third party source. In some embodiments, the code repository 108 may include a single program package or a variety of program packages. In some embodiments, rather than a code repository 108 for storing software packages, the code repository 108 may include containers, virtual machines, or other code sources that may be installed or initialized on one or more user devices 130.

The signature generator 102 may generate signatures for individual packages within the code repository 108. For example, a single signature may be generated for each package. In some embodiments, the signature generator 102 may generate multiple signatures for particular packages based on version history as well. To generate a signature, the signature generator 102 may generate one or more signature tags that are included with packages in the code repository for distribution by the distribution interface 106. In an example implementation, the signature tags in the following table may be populated by the signature generator 102 and later used for verification of the package by a user device 130.

| Constant | Value | Type | Required? |
| --- | --- | --- | --- |
| SIGTAG_SIGSIZE | 1000 | INT32 | Yes |
| SIGTAG_PGP | 1002 | BIN | Optional |
| SIGTAG_MD5 | 1004 | BIN | Yes |
| SIGTAG_GPG | 1005 | BIN | Optional |
| SIGTAG_PAYLOADSIZE | 1007 | INT32 | Optional |
| SIGTAG_SHA1HEADER | 1010 | STRING | Optional |
| SIGTAG_DSAHEADER | 1011 | BIN | Optional |
| SIGTAG_RSAHEADER | 1012 | BIN | Optional |

The SIGTAG_SIGSIZE tag specifies the size of the header and payload sections, while the SIGTAG_PAYLOADSIZE holds the uncompressed size of the payload. In some embodiments, to verify the integrity of the package, the SIGTAG_MD5 tag holds a 128-bit MD5 checksum of the header and payload sections. The SIGTAG_SHA1 HEADER holds an SHA1 checksum of the entire header section. To verify the authenticity of the package, the SIGTAG_PGP tag holds a Version 3 OpenPGP Signature Packet RSA signature of the header and payload areas. The SIGTAG_GPG tag holds a Version 3 OpenPGP Signature Packet DSA signature of the header and payload areas. The SIGTAG_DSAHEADER holds a DSA signature of just the header section. If the SIGTAG_DSAHEADER tag is included, the SIGTAG_GPG tag must also be present. The SIGTAG_RSAHEADER holds an RSA signature of just the header section. If the SIGTAG_RSAHEADER tag is included, the SIGTAG_PGP tag must also be present.

The signature generator 102 may also generate a signature that is included with the signature tag holding a checksum for verification. For example, the checksum may be generated based on the contents of the package. In some embodiments, additional checksums may be generated for the package header, the package payload, and a combination of the header and payload for additional security.

The blockchain interface 104 stores generated signatures or indications of the generated signatures in the blockchain system 110. For example, the blockchain interface 104 may include the addresses of one or more blockchain wallets associated with the blockchain system 110. In some embodiments, the blockchain interface 104 may include addresses associated with multiple blockchain systems 110. The blockchain interface 104 may then initiate a transaction to store one or more of the generated signatures in the blockchain 121. For example, the signature or signature data may be stored as metadata in a transaction or as metadata spread across multiple transactions. In some embodiments, multiple signatures may be stored in a single transaction. Additionally, in some embodiments, the blockchain interface 104 may use or generate a Merkle root that can be stored in one or more blockchains 121 for verification of anchored data (including generated signatures).

A distribution interface 106 can provide code from the code repository 108 to a user device 130 as a code distribution 134. In some embodiments, the user device 130 may request the code distribution 134 from the package management system 100. The package management system 100 may also push updates or other code to the user device 130. The code distribution may be provided through network 140. In some embodiments, one or more third party system may provide code from code repository 108 to a user device 130. Accordingly, the signature generator 102 may generate an authentication signature 122 for use by the user device 130, but the code distribution 134 may be from a different entity than the package management system 100.

The blockchain system 110 includes a node 120 that stores a blockchain 121. While shown as a single node 120, the blockchain system 110 may include a large number of nodes 120 that each store a copy, or portion of a copy, of the blockchain 121. The blockchain may include a number of transaction blocks as describe above. In at least one of the transaction blocks, a transaction may include a signature 122 that was recorded in metadata by the package management system 100. Accordingly, the signature 122 can be stored in a distributed and immutable format for access by a user device 130.

The user device 130 can include a code distribution 134 and a code verification service 136. The code distribution 134 may include a package, container, executable, or other application received from the package management system 100 or a third party system. The code distribution 134 may include binary code, source code, or compressed code for execution by the user device 130. Before installing or initializing code from the code distribution 134, the user device 130 may verify that the code is from the correct source and has not been corrupted.

Accordingly, the code verification service 136 may check the signature 122 that was stored in blockchain 121. In some embodiments, the code verification service 136 may determine an address to check from the code distribution 134, from package management system 100, or from another trusted source. In some embodiments, rather than searching for the transaction 122 that includes the signature, the code verification service 136 may access a Merkle root in blockchain 121 to validate anchored data. After the user device 130 verifies that authenticity of the code distribution 134 based on the signature 122, it may proceed to install or initialize the code distribution 134.

Figure 2:
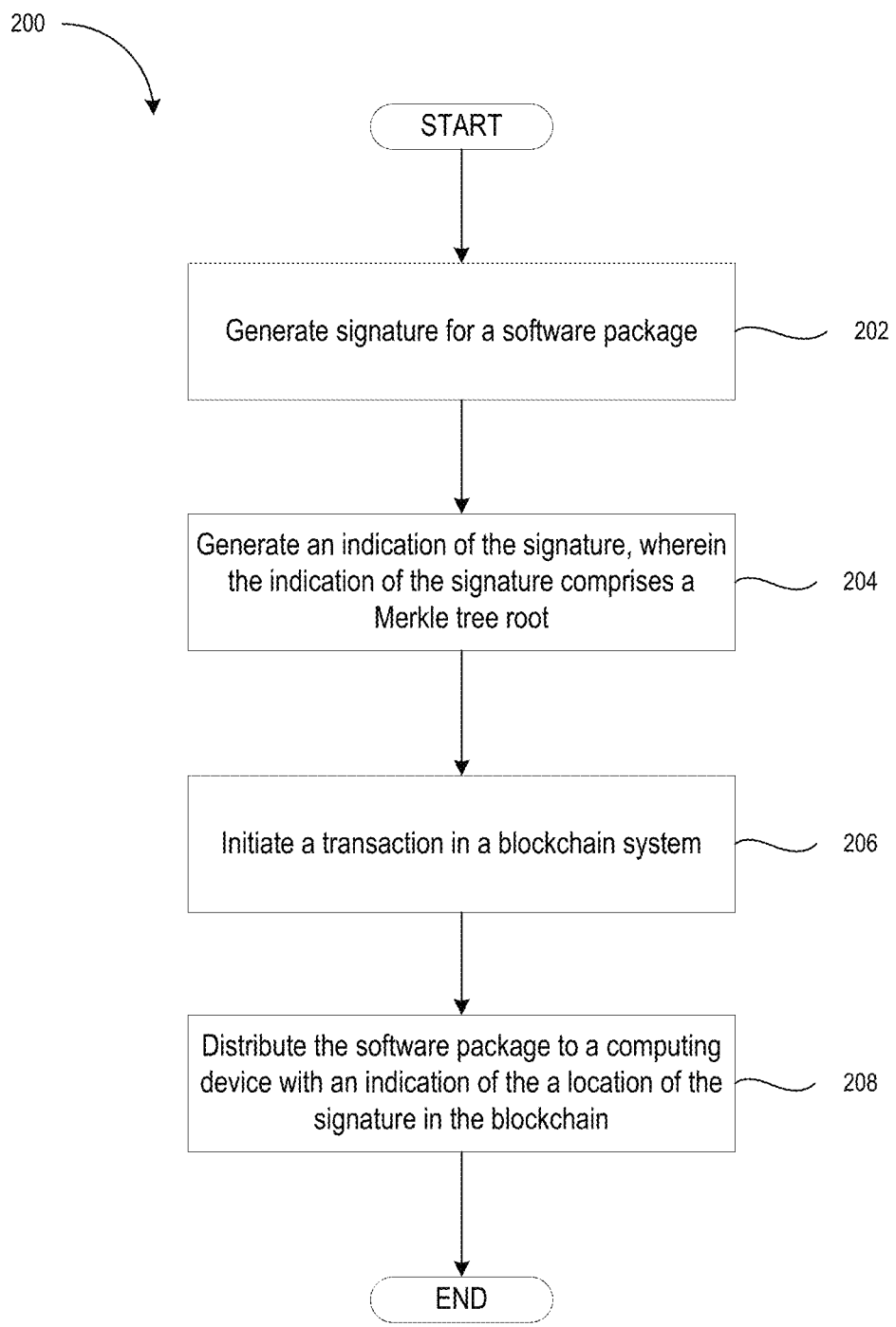
FIG. 2 is a flow diagram that illustrates an example method of managing distribution of signatures, in accordance with some aspects of the present disclosure.

FIG. 2 is a flow diagram illustrating an example method 200 of managing security of signatures of software packages, in accordance with some aspects of the present disclosure. The method 200 may be performed by processing logic that comprises hardware (e.g., circuitry, dedicated logic, programmable logic, microcode, etc.), software (e.g., instructions run on a processing device to perform hardware simulation), or a combination thereof. For example, the method 200 may be performed by one or more of the systems or components described with reference to FIG. 1.

Beginning in block 202, a package management system generates a signature for a software package. For example, the signature may be generated based on a hash or cryptographic method performed on the code in the software package, the header of the software package, or the like. In some embodiments, a combination of signatures may be generated for additional verification. In some embodiments, the package management system may further include one or more of a package identifier, a signature, a header, and software code itself. In some embodiments, one or more of these components may be compressed or encrypted.

In block 204 the package management system may generate an indication of the signature, wherein the indication of the signature comprises a Merkle tree root. For example, the package management system may generate a hash of the signature as well as a hash of a number of other signatures or data to be stored on the blockchain. The hashes of those signatures may then be combined and hashed again until there is a single Merkle tree root for a Merkle tree. The Merkle tree root can then be used by a computing system to verify each signature used to generate the Merkle tree. In some embodiments, rather than generating a Merkle tree, a signature may be stored directly onto the blockchain.

In block 206, the package management system may initiate a transaction in a blockchain system. The metadata of the transaction can include the Merkle tree. Therefore, a computing system attempting to use the Merkle tree to verify a package signature can access the Merkle tree root in an immutable format. In some embodiments, in addition to the Merkle tree root, additional hashes in branches of the tree may also be stored in the blockchain. In some embodiments, the transaction may include an indication of the signature for the software package and is to be stored in a blockchain. For example, the signature itself may be stored, a Merkle tree that anchors the signature may be stored, or other information may be stored. To initiate the transaction, the package management system may provide sending and receiving addresses of the blockchain system. In some embodiments, the transaction may involve a portion of currency associated with the blockchain. In some embodiments, an operation which records data without using a transaction of currency may be used by the package management system.

In block 208, the package management system distributes the software package to a computing device with an indication of the location of the signature in the blockchain. For example, a timestamp, transaction identifier, or other indication of the location of the signature may be provided. In some embodiments, other indicators of the location may be provided. The distribution may be directly to a consumer that will use the package or may be to a third party entity to distribute the software package further. A computing system can then use the signature, as identified in the blockchain, to verify the authenticity of the package. In some embodiments, instead of software packages, similar processes may be used to verify other portions of code. For example, executable code, containers, virtual machines, or other portions of code may be verified using signatures that are stored on a blockchain.

Figure 3:
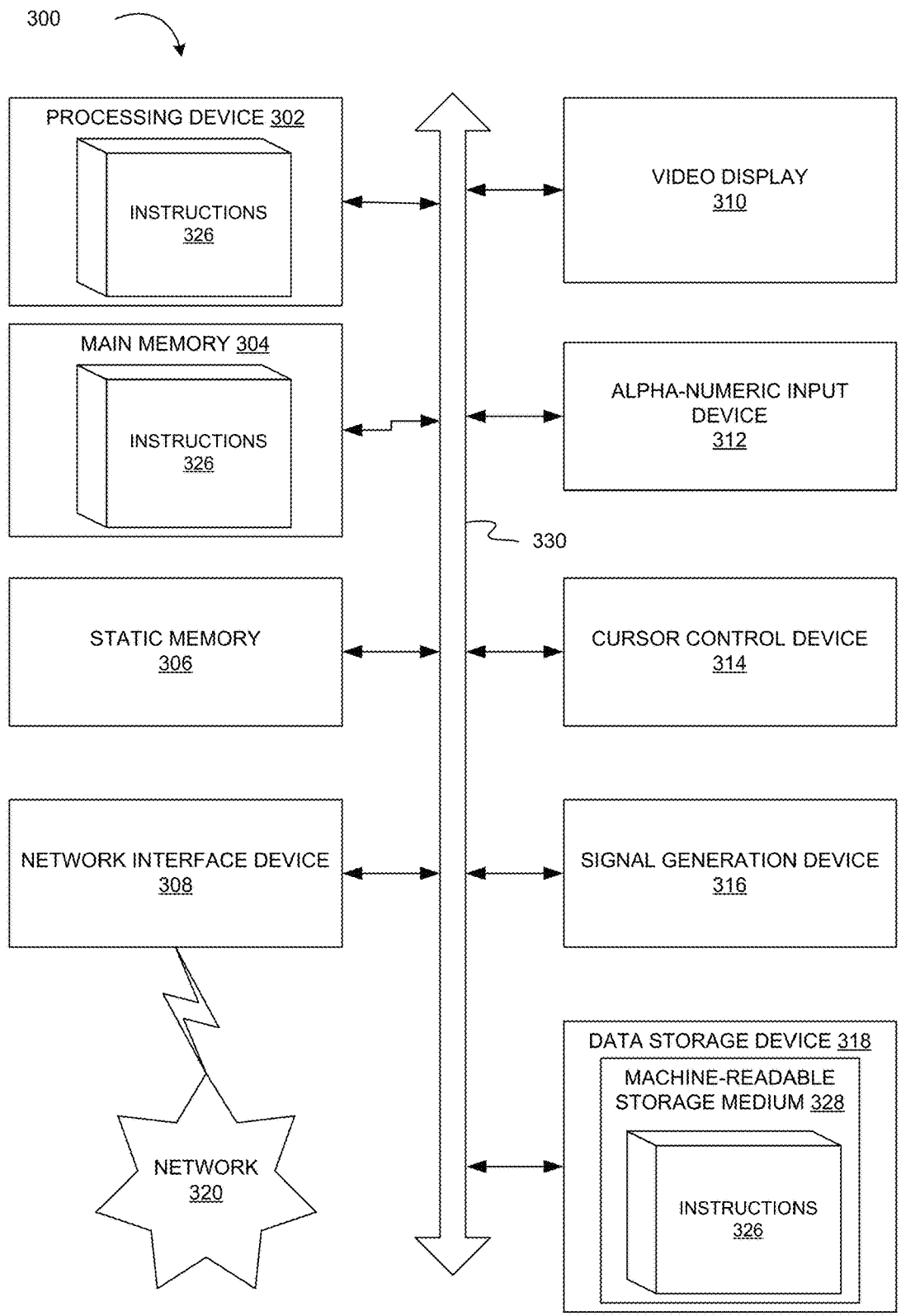
FIG. 3 illustrates an illustrative computer system operating in accordance with one or more aspects of the present disclosure.

FIG. 3 illustrates a diagrammatic representation of a machine in the example form of a computer system 300 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM), a static memory 306 (e.g., flash memory, static random access memory (SRAM), etc.), and a data storage device 318, which communicate with each other via a bus 330. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 is configured to execute processing logic 326, which may be one example of system 100 shown in FIG. 1, for performing the operations and steps discussed herein.

The data storage device 318 may include a machine-readable storage medium 328, on which is stored one or more sets of instructions 322 (e.g., software) embodying any one or more of the methodologies of functions described herein, including instructions to cause the processing device 302 to execute one or more update analysis services as described herein. The instructions 322 may also reside, completely or at least partially, within the main memory 304 or within the processing device 302 during execution thereof by the computer system 300; the main memory 304 and the processing device 302 also constituting machine-readable storage media. The instructions 322 may further be transmitted or received over a network 320 via the network interface device 308.

The machine-readable storage medium 328 may also be used to store instructions to perform a method for generating and storing signatures in an immutable storage system (e.g., blockchain), as described herein. While the machine-readable storage medium 328 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Figure 4:
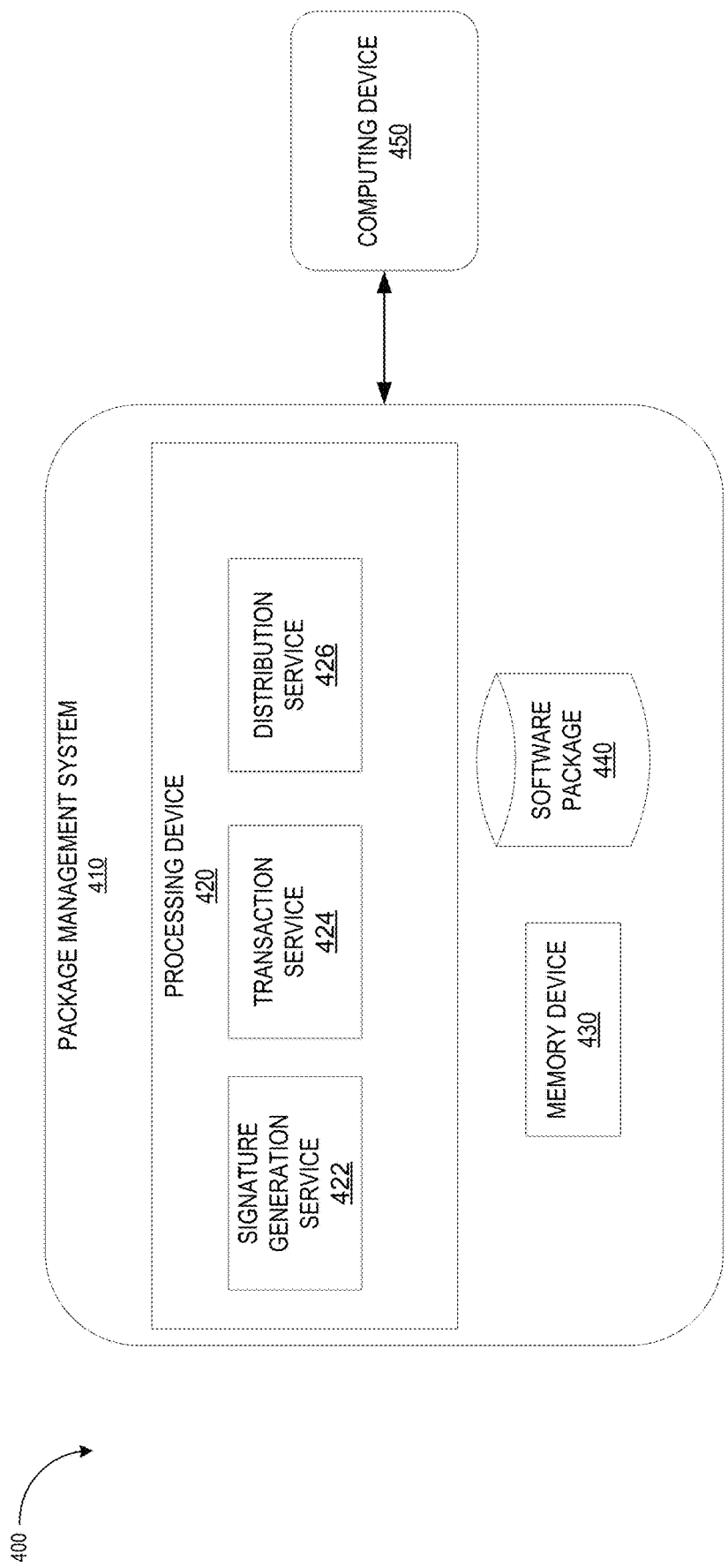
FIG. 4 is a block diagram that illustrates an example of a package management system in accordance with some aspects of the present disclosure.

FIG. 4 is a block diagram 400 that illustrates an example of a package management system 410 in accordance with some aspects of the present disclosure. A processing device 420 is coupled to a memory device 430. The processing device 420 may include a change signature generation service 422, a transaction service 424, and a distribution service 426. The software package 440 may be stored in the memory device 430 or other portions of the package management system 410. As the package management system 410 receives or generates new code for distribution, the signature generation service 422 can generate one or more signatures for the software package 440. The transaction service 424 can then initiate a transaction on a blockchain system. The transaction can include the signature or an indication of the signature for the package. The distribution service 426 can then distribute the software package 440 and provide an indication of the location of the signature within the blockchain for verification by computing devices 450.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method comprising:
   initiating, by a processing device, one or more transactions in a blockchain system, wherein the one or more transactions comprise a first indication of a first signature for a first software package and a second indication of a second signature for a second software package, each of the first indication and the second indication to be stored in a blockchain, wherein the first signature comprises a first plurality of checksums that are each generated using at least part of the first software package and the second signature comprises a second plurality of checksums that are each generated using at least part of the second software package; and
   distributing at least one of the first software package to a computing device with an indication of a location of the first signature in the blockchain or the second software package to the computing device with an indication of a location of the second signature in the blockchain.

2. The method of claim 1, further comprising:
   generating the first signature for the first software package; and
   generating the first indication of the first signature.

3. The method of claim 1, wherein initiating the one or more transactions comprises designating a first address to send a cryptocurrency, a second address to receive the cryptocurrency, and metadata comprising the first indication of the first signature.

4. The method of claim 1, wherein initiating the one or more transactions comprises providing the first indication of the first signature as metadata in a provable prune-able transaction to the blockchain.

5. The method of claim 1, further comprising initiating a second transaction in a second blockchain system, wherein the second transaction comprises the first indication of the first signature for the first software package and is to be stored in a second blockchain.

6. The method of claim 1, further comprising:
   generating the second signature for the second software package.

7. The method of claim 2, further comprising distributing the first software package to a second computing device with the first indication of the location of the first signature in the blockchain.

8. A non-transitory computer-readable storage medium including instructions that, when executed by a processing device, cause the processing device to:
   initiate, by a processing device, one or more transactions in a blockchain system, wherein the one or more transactions comprise a first indication of a first signature for a first software package and a second indication of a second signature for a second software package, each of the first indication and the second indication to be stored in a blockchain, wherein the first signature comprises a first plurality of checksums that are each generated using at least part of the first software package and the second signature comprises a second plurality of checksums that are each generated using at least part of the second software package; and
   distribute at least one of the first software package to a computing device with an indication of a location of the first signature in the blockchain or the second software package to the computing device with an indication of a location of the second signature in the blockchain.

9. The non-transitory computer-readable storage medium of claim 8, wherein the processing device further to:
   generate the first signature for the first software package; and
   generate the first indication of the first signature.

10. The non-transitory computer-readable storage medium of claim 8, wherein to initiate the one or more transactions comprises designating addresses to send and receive a cryptocurrency.

11. The non-transitory computer-readable storage medium of claim 8, wherein to initiate the one or more transactions the processing device is further to designate metadata comprising the respective indication of the respective signature.

12. The non-transitory computer-readable storage medium of claim 8, wherein to initiate the one or more transactions the processing device is further to provide the respective indication of the respective signature as metadata in a provable prune-able transaction to the blockchain.

13. The non-transitory computer-readable storage medium of claim 8, wherein the processing device is further to initiate a second transaction in a second blockchain system, wherein the second transaction comprises the first indication of the first signature for the first software package and is to be stored in a second blockchain.

14. The non-transitory computer-readable storage medium of claim 8, wherein the processing device is further to:
   generate the second signature for the second software package.

15. The non-transitory computer-readable storage medium of claim 8, wherein the processing device is further to distribute the first software package to a second computing device with the first indication of the location of the first signature in the blockchain.

16. A system comprising:
   a memory device; and
   a processing device operatively coupled to the memory device, the processing device to:
   initiate, by a processing device, one or more transactions in a blockchain system, wherein the one or more transactions comprise a first indication of a first signature for a first software package and a second indication of a second signature for a second software package, each of the first indication and the second indication to be stored in a blockchain, wherein the first signature comprises a first plurality of checksums that are each generated using at least part of the first software package and the second signature comprises a second plurality of checksums that are each generated using at least part of the second software package; and
   distribute at least one of the first software package to a computing device with an indication of a location of the first signature in the blockchain or the second software package to the computing device with an indication of a location of the second signature in the blockchain.

17. The system of claim 16, wherein the processing device is further to generate the first signature for the first software package.

18. The system of claim 16, wherein to initiate the one or more transactions the processing device is further to designate a first address to send a cryptocurrency, a second address to receive the cryptocurrency, and metadata comprising the first indication of the first signature.

19. The system of claim 16, wherein the processing device is further to initiate a second transaction in a second blockchain system, wherein the second transaction comprises the first indication of the first signature for the first software package and is to be stored in a second blockchain.

20. The system of claim 16, wherein the processing device is further to:
   receive the first software package and initiate an installation procedure;
   identify the location of the first indication of the first signature for the first software package;
   access the one or more transactions, wherein the one or more transactions comprise the first indication of the first signature; and
   verify the first software package in view of the package signature.

* * * * *